Oct. 22, 1968  A. BOUWERS  3,407,302
TELESCOPE SYSTEM

Filed Jan. 21, 1965  2 Sheets-Sheet 1

INVENTOR
ALBERT BOUWERS
BY
ATTORNEYS

Oct. 22, 1968  A. BOUWERS  3,407,302
TELESCOPE SYSTEM
Filed Jan. 21, 1965  2 Sheets-Sheet 2

INVENTOR
ALBERT BOUWERS
BY
Dean, Fairbank & Hirsch
ATTORNEYS

United States Patent Office 3,407,302
Patented Oct. 22, 1968

3,407,302
TELESCOPE SYSTEM
Albert Bouwers, The Hague, Netherlands, assignor to N.V., Optische Industrie de Oude Delft, Delft, Netherlands, a corporation of the Netherlands
Filed Jan. 21, 1965, Ser. No. 426,873
Claims priority, application Netherlands, Jan. 23, 1964, 6400488
1 Claim. (Cl. 250—213)

ABSTRACT OF THE DISCLOSURE

A combined night and daylight telescope system in which an image tube and a relay lens are fixedly disposed next to each other and can selectively be switched into the optical path between the telescope objective and an eyepiece by means of a system of four plane reflectors two of which are movable between an operative and an inoperative position.

---

The invention relates to a telescope system, comprising a telescope objective, an image intensifying tube having its photocathode, in the focal plane of the telescope objective, an optical system including an eyepiece for viewing the image screen of the image intensifying tube, and an objective forming an intermediate image, which selectively can be substituted for the image intensifying tube in the optical path of the telescope, in such a manner that in both positions the focal plane of the telescope objective is imaged in the focal plane of the eyepiece. A system of the type indicated has become known in which the image intensifying tube and the objective, forming the intermediate image are single parts, which alternatively can be placed in a special mount in the telescope tube between the telescope objective and the eyepiece, dependent on whether the telescope should be used at night or in daylight.

A principal drawback of such a construction is that the setting and the parts to be placed in it must be manufactured with great precision and should maintain this accuracy in use, since every deviation in the relative positions of the conjugate focal planes gives rise to a loss in image quality. Furthermore, the removal and temporary storage of such delicate parts as optical lenses and image intensifier tubes form complicating factors in practical operation.

The device according to the invention which is free from these drawbacks has the image intensifying tube as well as the objective forming the intermediate image in fixed positions in the telescope housing such that their axes are substantially parallel, while in front of and behind the image intensifying tube as well as in front of and behind the objective forming the intermediate image at least one reflecting surface is placed in the optical path, at least two of these reflecting surfaces being adapted to be selectively brought into two different positions such that in one of these positions the image intensifying tube and in the other position the objective forming the intermediate image is put into operative condition.

Since in the telescope system according to the invention the image forming elements all have a fixed position in the telescope housing there is little risk of de-adjustment. The sole moving elements are two plane mirrors or prisms which are mounted in rotatably supported settings in the telescope housing to avoid the necessity to remove them when switching the device from day to night operation and vice versa. Thus, a completely closed and self-contained instrument can be obtained, which is able to withstand less careful handling and is simple and quickly to operate.

Figure 1:
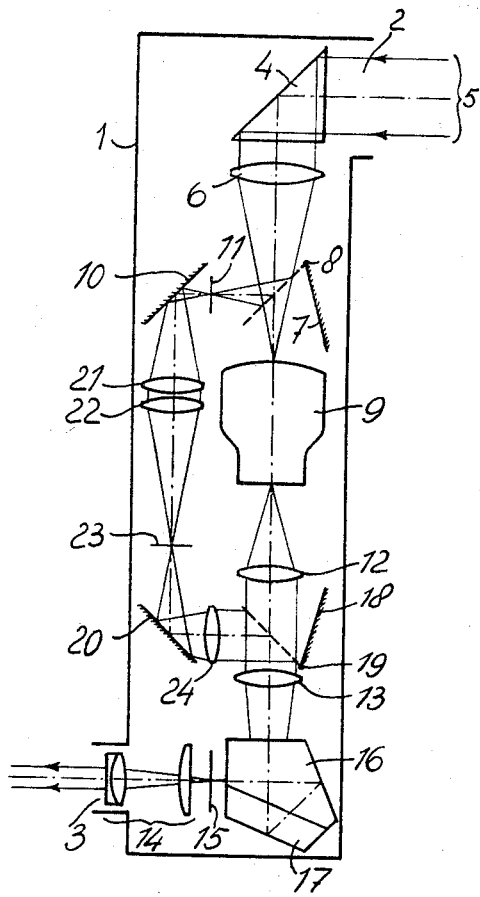
Figure 2:
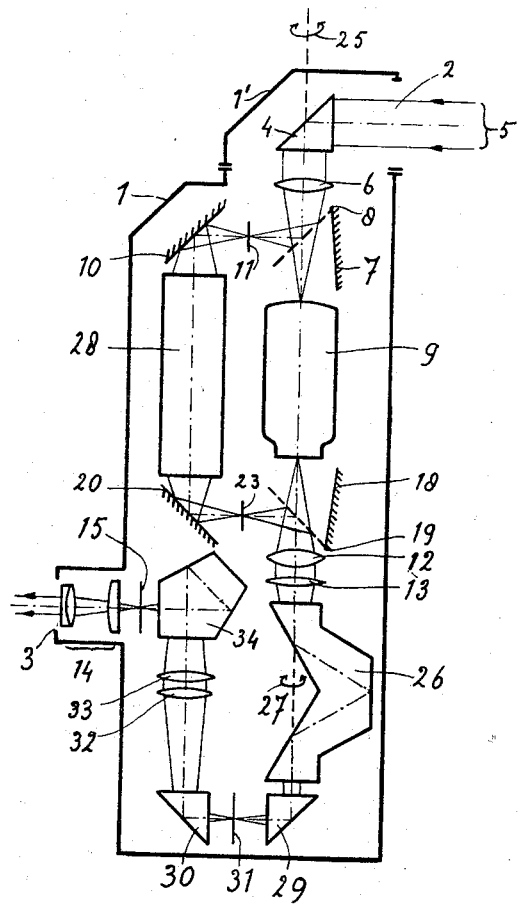

Some embodiments of the invention will now be described by way of example and with reference to the accompanying drawings, in which:

FIG. 1 shows diagrammatically in section a first type of telescope system embodying the invention; and FIG. 2 shows in similar form a second telescope system in accordance with the invention.

The telescope shown in FIG. 1 is of the periscope type, having a housing 1, with an entrance opening 2 at the top and an exit opening 3 at the lower end. A 45°-prism 4 behind the entrance opening bends the incoming beam 5 over 90° in the direction of the telescope objective 6. Under the objective is a plane mirror 7, whose mounting can be turned about an axis 8 so that the mirror can have two alternative positions. The drawn line gives the situation that the mirror is out of the beam thus enabling the telescope objective 6 to form an image on the photocathode of the image intensifying tube 9. On the other hand, in the position indicated by a dotted line the mirror 7 forms an angle of 45° with the optical axis causing the beam to bend in the direction of the mirror 10 which has a fixed position, and is also under 45° with the optical axis. In this case an intermediate image 11 is formed in air.

To observe the image screen of the image intensifying tube 9 at the desired magnification a magnifying optical system is mounted in the lower part of the telescope housing. It consists of the tandem objectives 12, 13 forming a magnified intermediate image 15, of the screen in the focal plane of the eyepiece 14. Between the lenses 12 and 13 the beam is parallel. Since the telescope objective 6 as well as the image intensifying tube 9 and the pair of tandem objectives 12, 13 will cause inversion of the image, a pentaprism 16 with a roof 17 is used for bending the beam towards the eyepiece 14 in order that the intermediate image 15 has the correct orientation.

In the parallel beam between the lenses 12 and 13 a plane mirror 18 is placed in a mounting which is pivotable about an axis 19, so that the mirror 18 can be alternatively brought outside the beam and in the beam under an angle of 45° with the optical axis. In this last case the mirror 18 will receive light from a plane mirror 20, which has a fixed position parallel to mirror 18. Between the mirrors 10 and 20 there is mounted a pair of tandem objectives 21 and 22 forming an intermediate image 23 of the image 11 made by the telescope objective 6.

Between the mirrors 18 and 20 a further objective 24 is provided of which the focal plane on the object side coincides with the image 23, thus causing a parallel beam leaving the objective 24. In this manner the objectives 24 and 13 also act as a tandem, forming the intermediate image 23 at the same place as does the tandem 12, 13 with respect to the screen of the image intensifying tube 9, i.e. in the focal plane of the eyepiece 14.

It is noticed, that the magnification of the tandem systems 12, 13 and 24, 13 equals the ratio of the focal lengths of both parts. The device can be arranged such, that the focal length of the part 24 differs from that of the part 12. If a constant total magnification is required the intermediate image 23 must then be of a different size than the screen image of the image intensifying tube. In such a case the system 21, 22 is given a different magnification than the image intensifying tube.

The telescope system shown in FIG. 2 is similar to that of FIG. 1 in that it is also of the periscope type and has many components comparable in function to parts of the device of FIG. 1. These components are designated by like reference numbers.

A first difference, however, is that the 45° entrance prism 4 in FIG. 2 is mounted in a separate top portion 1' of housing 1 which is rotatable about the vertical optical axis in the sense of the arrows 25, thus enabling the user of the device to scan the horizon over an angle of 360° or any smaller angle. As is well-known, in such panoramic periscopes rotation of the entrance prism causes rotation of the image which in the example shown is compensated by means of a so-called Abbe-prism 26. This prism is mounted for rotation about the optical axis in the sense of the arrows 27 and is so mechanically coupled by conventional means (not shown) to the entrance prism 4 that it rotates at half the speed of the latter.

A second difference resides in the objective for forming the intermediate image 23. In the embodiment of FIG. 2 this objective 28 is a pancratic lens system which is capable of varying the magnification at which the intermediate image 23 is formed between certain limits without any noticeable shift of focus. Pancratic lens systems consist of a number of lenses some of which can be axially displaced concurrently to achieve the change in magnification. Since many varieties of such systems are well-known in the art there is no need to discuss this type of lens in detail here.

It will be seen that, apart from the differences above indicated, the upper part of the telescope shown in FIG. 2 down to the mirrors 18 and 20 is similar to the corresponding portion of the telescope of FIG. 1. Thus, by moving the mirrors 8 and 18 from the position indicated in drawn lines into those indicated by dotted lines the image intensifier tube 9 may be cut out and the pancratic system 28 inserted in the light path for daylight operation. In the latter position image 23 may be made to vary in size by adjusting the lens system 28. Likewise, during night-viewing the screen image of the electronic intensifier 9 may be made to vary in size, if desired, by adjusting the electric and/or magnetic focusing fields in the tube in a manner also well-known in the art.

Both lenses of the tandem 12, 13 are now placed in the common light path behind the mirror 18 so that lens 24 shown in FIG. 1 can be omitted. Since lens 13 has longer focal length than lens 12 the image 31 is magnified. In order that the Abbe-prism 26 can be readily accommodated a further pair of tandem objectives 32, 33 is provided to project the image 31 of tandem 12, 13 in the focal plane 15 of the eyepiece 14. A pair of 45°-prisms 29, 30 is placed at the lower end of the housing to bend the optical axis twice. Finally, a pentaprism 34 is used to direct the light beam into the eyepiece 14 and to restore the orientation of the image.

It will be evident that the present invention is applicable to night telescopes intended for use in conjunction with infrared flood lights (active night observation) as well as to such telescopes which make use of the natural available light only (passive night observation).

What I claim is:

1. A combined night and daylight telescope system comprising a telescope objective, an image intensifying tube having a photocathode and an image screen, a viewing optical system including a stationary eyepiece, a relay objective fixedly aligned side-by-side with said tube on an optical axis substantially parallel with an optical axis of said tube, a first plane reflecting element optically aligned on said tube axis between said telescope objective and said photocathode and movable between two positions in and outside the path of light, respectively, a second plane reflecting element in optical alignment with and fixedly disposed to deviate light received from said first reflecting element when it is in the path of light, a third plane reflecting element optically aligned on said tube axis between said image screen and said eyepiece and movable between two positions in and outside the path of light, respectively, and a fourth plane reflecting element fixedly disposed on the optical axis between said second and third reflecting elements to transmit light toward said third reflecting element and thence to the eyepiece when said third reflecting element is in the path of light, said relay objective transmitting light from said second reflecting element toward said fourth reflecting element and thereby presenting an intermediate image of the focal plane of said telescope objective to said viewing optical system when said first and third reflecting elements are in a first one of their said two positions in the path of light, said tube receiving the image from said telescope objective on its photocathode and presenting its image screen for observation to said viewing optical system when said first and third reflecting elements are in the second of their said two positions out of the path of light, said viewing optical system comprising a first objective having its focal plane in said image screen, a second objective whose focal plane is coincident with the focal plane of said eyepiece, and a third objective whose focal plane is coincident with said intermediate image, one of said first and third objectives being in optical alignment with said second objective and separated therefrom by an air space, said third reflecting element being disposed in said air space so as to transmit to said second objective light from said first objective when said third reflecting element is in one position and light from said third objective when said third reflecting element is in the other position.

References Cited

UNITED STATES PATENTS

| | | | |
|---|---|---|---|
| 869,395 | 10/1907 | Schleth | 350—34 |
| 2,946,255 | 7/1960 | Bolay | 250—213 X |
| 3,124,682 | 3/1964 | Kojima, et al. | 250—213 |
| 3,290,927 | 12/1966 | Gambs | 351—6 |
| 3,324,300 | 6/1967 | Bouwers | 250—213 |

DAVID SCHONBERG, *Primary Examiner.*

P. R. GILLIAM, *Assistant Examiner.*